(12) United States Patent
LeBel et al.

(10) Patent No.: US 12,026,711 B2
(45) Date of Patent: Jul. 2, 2024

(54) E-COMMERCE SECURITY ASSURANCE NETWORK

(71) Applicant: Bright Lion, Inc., Seattle, WA (US)

(72) Inventors: Lawrence B. LeBel, Arcata, CA (US);
Brian D. Tawney, Portland, OR (US);
Cathi L. Peck, Portland, OR (US);
Kurt L. Sussman, Portland, OR (US)

(73) Assignee: Bright Lion, Inc., Seattle, WA (US)

( * ) Notice: Subject to any disclaimer, the term of this patent is extended or adjusted under 35 U.S.C. 154(b) by 0 days.

(21) Appl. No.: 17/245,957

(22) Filed: Apr. 30, 2021

(65) Prior Publication Data

US 2021/0342832 A1    Nov. 4, 2021

Related U.S. Application Data

(60) Provisional application No. 63/018,219, filed on Apr. 30, 2020.

(51) Int. Cl.
*G06Q 20/40* (2012.01)
*G06Q 20/02* (2012.01)
(Continued)

(52) U.S. Cl.
CPC ........... *G06Q 20/401* (2013.01); *G06Q 20/02* (2013.01); *G06Q 20/04* (2013.01); *G06Q 20/12* (2013.01); *G06Q 30/0633* (2013.01)

(58) Field of Classification Search
CPC ...... G06Q 20/401; G06Q 20/12; G06Q 20/04; G06Q 20/02; G06Q 30/0633
See application file for complete search history.

(56) References Cited

U.S. PATENT DOCUMENTS 7,152,244 B2    12/2006  Toomey
7,636,742 B1 *  12/2009  Olavarrieta ......... G06F 16/2425
                                            715/255
(Continued)

FOREIGN PATENT DOCUMENTS

WO    2013019567 A2    2/2013
WO    WO-2015126755 A1 *  8/2015  ............. G06Q 20/12
(Continued)

OTHER PUBLICATIONS

"Definitions for secure communication," Definitions, dated Mar. 2, 2021, https://web.archive.org/web/20210302031700/https://www.definitions.net/definition/secure+communication (Year: 2021).*
(Continued)

*Primary Examiner* — Gregory S Cunningham, II
*Assistant Examiner* — Raven E Yono
(74) *Attorney, Agent, or Firm* — Han Santos, PLLC

(57) ABSTRACT

This disclosure describes techniques that enable a security assurance network to secure entry of sensitive payment data associated with a merchant transaction. A security assurance webserver is configured to receive order context data associated with the merchant transaction, and selectively establish a secure webpage on the client workstation that overlays a presentation of a merchant webpage. The security assurance webserver may receive encrypted payment data via the secure webpage for transmission to an application server within a security assurance network, and in response, facilitate a processing of the payment data via the application server. In turn, the application server may transmit a payment message indicating whether the payment data was successfully processed.

17 Claims, 8 Drawing Sheets

(51) Int. Cl.
   *G06Q 20/04*     (2012.01)
   *G06Q 20/12*     (2012.01)
   *G06Q 30/0601*   (2023.01)

(56) References Cited

U.S. PATENT DOCUMENTS

| | | | |
|---|---|---|---|
| 8,458,487 | B1 | 6/2013 | Palgon et al. |
| 8,464,352 | B2 | 6/2013 | Toomey |
| 9,514,452 | B2 * | 12/2016 | Dhar .................... G06Q 20/384 |
| 9,609,025 | B1 | 3/2017 | Betzler et al. |
| 10,928,906 | B2 | 2/2021 | Balint |
| 11,080,700 | B2 * | 8/2021 | Ortiz .................... G06Q 20/023 |
| 2004/0117302 | A1 * | 6/2004 | Weichert ............ G06Q 20/1085 |
| | | | 705/40 |
| 2008/0244277 | A1 * | 10/2008 | Orsini .................... H04L 63/10 |
| | | | 713/193 |
| 2011/0296531 | A1 | 12/2011 | Toomey |
| 2012/0259782 | A1 * | 10/2012 | Hammad ............ G06Q 20/3674 |
| | | | 705/44 |
| 2012/0323784 | A1 | 12/2012 | Weinstein et al. |
| 2014/0122198 | A1 | 5/2014 | Cheung et al. |
| 2014/0188734 | A1 | 7/2014 | Neuwirth |
| 2014/0337238 | A1 | 11/2014 | Leighton |
| 2016/0125397 | A1 * | 5/2016 | Strydom .......... G06Q 20/38215 |
| | | | 705/66 |
| 2016/0277374 | A1 | 9/2016 | Reid et al. |
| 2017/0270515 | A1 * | 9/2017 | McCullagh .......... G06Q 20/363 |
| 2017/0308882 | A1 | 10/2017 | Bedier et al. |
| 2017/0357957 | A1 * | 12/2017 | Mehta ................ G06Q 30/0635 |
| 2018/0082289 | A1 | 3/2018 | Johnson et al. |
| 2019/0354718 | A1 | 11/2019 | Chandnani et al. |
| 2019/0384933 | A1 | 12/2019 | Lebel et al. |
| 2020/0143375 | A1 * | 5/2020 | Gurunathan ......... G06Q 20/409 |
| 2021/0029100 | A1 * | 1/2021 | Bendersky .......... H04L 63/0876 |

FOREIGN PATENT DOCUMENTS

| | | | | |
|---|---|---|---|---|
| WO | WO-2018118067 | A1 * | 6/2018 | ............. G06Q 20/02 |
| WO | 2019231457 | A1 | 12/2019 | |
| WO | WO-2020104809 | A1 * | 5/2020 | ........... G06Q 20/227 |

OTHER PUBLICATIONS

"Secure Communication for Internet Payment in Heterogeneous Networks" by Refka Abdellaoui, dated 2010 https://ieeexplore.ieee.org/stamp/stamp.jsp?tp=&arnumber=5474833 (Year: 2010).*

Anonymous: "Technologies for Payment Fraud Prevention: EMV, Encryption, and Tokenization", Smart Card Alliance, Oct. 2014 (Oct. 2014), XP055743920, Retrieved from the Internet: URL:www.smartcardalliance.org [retrieved on Oct. 26, 2020].

European Patent Application No. 19822457.8, Search Report dated Jan. 14, 2022, 10 pages.

European Patent Application No. 21171711.1, Search Report dated Sep. 29, 2021, 8 pages.

International Patent Application PCT/US2019/037820, Search Report and Written Opinion, dated Sep. 10, 2019, 12 pages.

U.S. Appl. No. 16/443,500, Final Office Action dated Nov. 18, 2021, 22 pages.

U.S. Appl. No. 16/443,500, Office Action dated Jun. 9, 2021, 34 pages.

Canadian Patent Application No. 3116912, Office Action dated Jun. 2, 2022, 4 pages.

NPL Search Terms (Year 2022).

U.S. Appl. No. 16/443,500, Notice of Allowance dated Jun. 28, 2022, 40 pages.

Canadian Patent Application No. 3116912, Office Action mailed Jan. 13, 2023, 4 pages.

European Patent Application No. 19822457.8, Office Action mailed Jun. 2, 2023, 6 pages.

* cited by examiner

E-COMMERCE SECURITY ASSURANCE NETWORK

RELATED APPLICATION

This application claims priority to a commonly owned, U.S. Provisional Patent Application No. 63/018,219, filed on Apr. 30, 2020, and titled "E-Commerce Security Assurance," which is herein incorporated by reference in its entirety.

BACKGROUND

Cybersecurity threats compromise our computing and communication infrastructure and the trust that governments, enterprises, and the public have in applications running on that infrastructure. Cybersecurity threats include any design flaws that may be exploited by malicious actors resulting in the theft or damage of computing and communication assets, including sensitive personal information. With the current volume of known cybersecurity breaches, responsible parties engaged in information technology (IT) are facing ever-increasing costs to manage that risk.

Regulatory and compliance regimes are a means to reduce cybersecurity threats and related threats to data privacy, e.g., identity theft, credit card fraud, etc. For example, financial institutions may impose a requirement for merchant enterprises that deal with remote purchases to comply with cybersecurity standards, such as the Payment Card Industry Data Security Standard (PCI DSS). Compliance with PCI DSS may be considered by the financial institutions as a precondition for an offering of their services to a merchant enterprise.

Consequently, merchant enterprises face the dilemma of bearing the cost of complying with a cybersecurity standard, such as PCI DSS, or bearing the cost of contracting a service provider to implement the necessary controls, protocols, and software that shows compliance. Compliance with cybersecurity standards, such as the PCI DSS, present a class of communication problems associated with the transmission of sensitive data (e.g., financial data) from a merchant device to a transaction processing agent. The merchant enterprise is accountable for the security and compliance of each transmission of sensitive data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
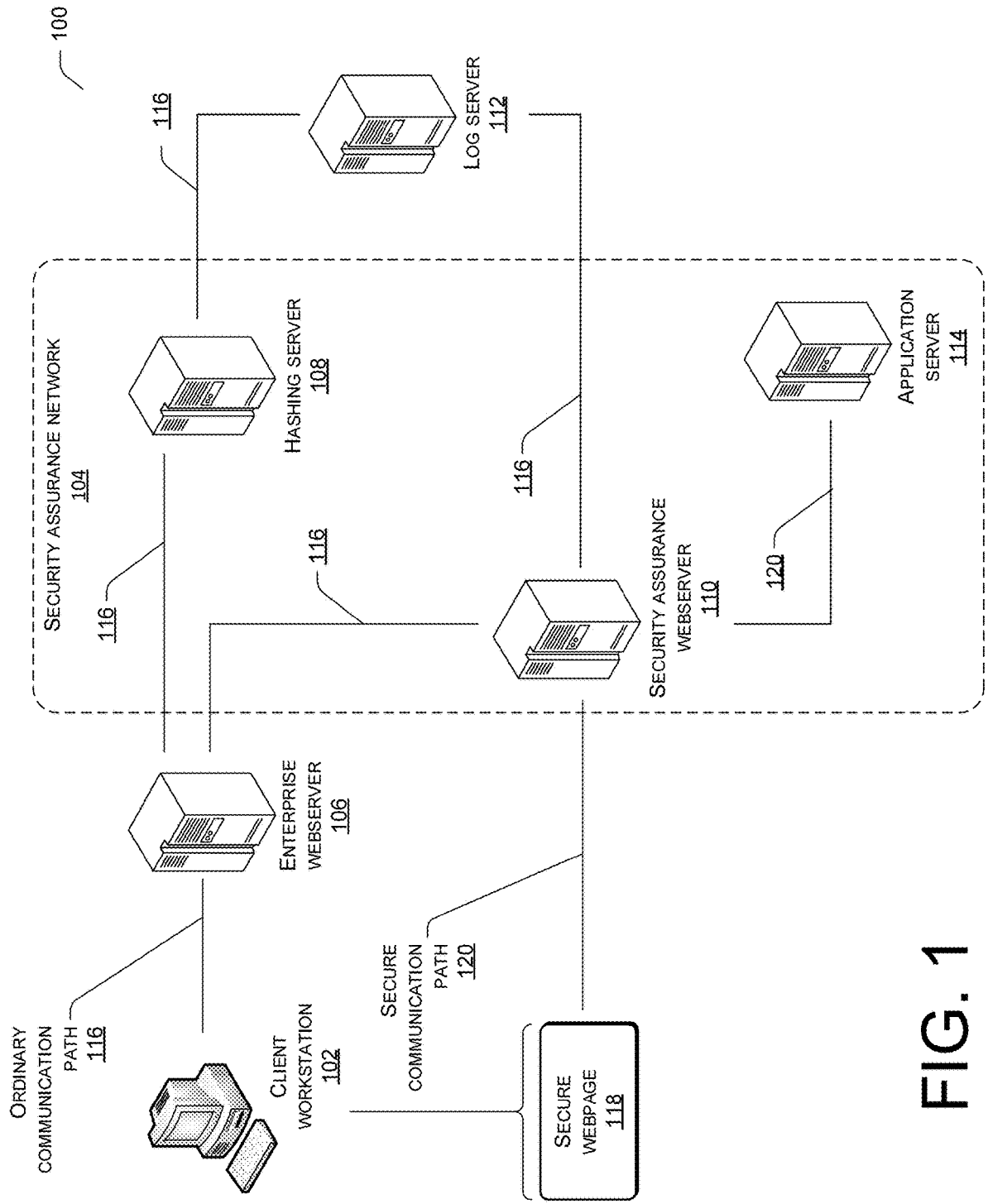
FIG. 1 illustrates an exemplary computing environment that facilitates isolating sensitive data associated with a merchant transaction from a client workstation.

This disclosure describes techniques for assuring the security of sensitive cardholder data in ecommerce transactions that originate in a webserver that is not in a PCI-validated secure environment, and for the transfer of risk associated with compliance of a cybersecurity standard, such as the Payment Card Industry Data Security Standard (PCI DSS) for ecommerce merchant transactions, from one party to another. Moreover, this disclosure describes techniques to architect a separation of software components, services, communication channels, and data, such that the handling of sensitive data in a standards-compliant manner may be isolated to a designated security assurance network. The security assurance network may be configured to isolate the use and transfer of sensitive data that would otherwise be exposed to the risk of data theft and to provide compliance with PCI DSS for the ecommerce system.

Traditionally, system components of a computing environment that are exposed to sensitive data may be subject to a Regulatory Compliance Assessor (RCA) audit. Sensitive data may include personally identifiable information, such as a Primary Account Number (e.g., a credit card number, social security number, or bank account number) and/or user authentication credentials.

By way of example, an RCA audit may be pursuant to a PCI DSS cybersecurity standard. The PCI DSS cybersecurity standard has adopted scoping categories that determine whether a system component is subject to an RCA audit. The scoping categories include:

Category One—System components that process, store, or transmit sensitive data such as cardholder data (CHD) or system components that are not isolated or restricted through controlled access from other Category one components.

Category Two—System components that have controller access to a category one system component, but do not ever process, store, or transmit sensitive data.

Category Three—System components that are isolated from all category one system components.

In this regard, system components that fall within category one and category two are subject to an RCA audit pursuant to the PCI DSS cybersecurity standard. In a non-limiting example, consider a client workstation that is facilitating a consumer ecommerce transaction. The consumer may navigate to an ecommerce website to purchase a particular item. To facilitate the transaction, the consumer may enter PAN data into an available input field, as consideration for the transaction. The client workstation may transmit transaction details to an application server, via a webserver, to execute the transaction. Here, the PAN data is considered sensitive data, pursuant to the PCI DSS cybersecurity standard. Further, the webserver, and application server that receive, store, and/or transmit the PAN data may be considered category one systems, pursuant to the PCI DSS cybersecurity standard, and therefore subject to an RCA audit.

An RCA audit may act to transfer some liability associated with managing a system's cybersecurity threats from a system owner to an RCA auditor. While the transfer of some liability of cybersecurity threats may benefit the system owner, the cost penalty of transferring the liability may be burdensome on some system owners. Therefore, this disclosure describes a security assurance webserver that is configured to assure the security of sensitive data, thus keeping the web and application servers, outside the scope of PCI DSS compliance, and not subject to an RCA audit.

The techniques described herein may facilitate isolating sensitive data that is entered as part of an ecommerce transaction, by invoking a secure webpage that is provisioned by the security assurance webserver. As part of a secure assurance network, the security assurance webserver may configure the secure webpage to overlay the presentation of a merchant webpage on a client workstation. Accordingly, the entry of sensitive data can be assured to occur only on the intended secure server, thus protecting the sensitive data and complying with the requirements of PCI DSS even from an enterprise webserver that is not itself PCI-validated.

By way of example, consider a consumer initiating a merchant transaction at a client workstation. In this example, the consumer, via a client workstation, may initiate a merchant transaction on the merchant webpage. The client workstation, via the merchant webpage, may be configured to interact with an enterprise webserver of the security assurance network. In doing so, the enterprise webserver may interact with the merchant webpage on the client workstation to capture and generate order context data associated with the merchant transaction. Order context data may include a merchant identifier, merchant service provider, a product or service identifier, a consumer identifier for the consumer that initiated the merchant transaction, a transaction amount, a transaction currency, and acceptable forms of payment to fulfill the transaction, or any suitable combination thereof.

The enterprise webserver may interact with the client workstation via an ordinary communication path, which is configured to transmit non-sensitive data. Since the order context data does not include sensitive data (e.g., PAN data), the transmission of order context data does not trigger an RCA audit of the client workstation pursuant to the PCI DSS standard.

Moreover, the enterprise webserver may generate enterprise webserver (EWS) metadata that can be used to validate the integrity of the enterprise webserver. The EWS metadata may include the Internet Protocol (IP) address of the enterprise webserver, a merchant identifier, a date and time stamp associated with generating the EWS metadata, and filenames and hash total for a set of files on the enterprise webserver. The enterprise webserver may generate the hash total using a hash algorithm such as HMAC with SHA256, ECDSA, RSADDA-PSS, or any other suitable hash algorithm. Further, the set of files may comprise a portion of, but not all, files stored on the enterprise webserver. Alternatively, the set of files may comprise substantially all files stored on the enterprise webserver.

The enterprise webserver may transmit the EWS metadata to a hashing server to implement the validation process. Validation ensures that the files of the enterprise webserver, including the EWS metadata, have not been tampered with by an external actor. The hashing server may compare the hash total of the EWS metadata with a registered hash total associated with the enterprise webserver. If the hash total of the EWS metadata matches the registered hash total of the enterprise webserver, the hashing server can infer that the files of the enterprise webserver, including the EWS metadata, have not been tampered with by an external actor. Accordingly, the hashing server may return a "validated" message to the enterprise webserver.

If, however, the hash total of the EWS metadata does not match the registered hash total of the enterprise webserver, the hashing server may infer that the files of the enterprise webserver, including the EWS metadata, have been tampered with by an external actor. In response, the hashing server may return a "not validated" message to the enterprise webserver. If the hashing server returns a "not validated" message, the enterprise webserver may perform one of several discrete actions including, but not limited to, requesting that the consumer try and perform the merchant transaction again, direct the consumer to contact customer service, or direct the consumer to submit an order with a purchase order number.

In response to validating the integrity of EWS metadata, the enterprise webserver may transmit the order context data to the security assurance webserver of the security assurance network. In turn, the security assurance webserver may use the order context data to generate a secure webpage dataset for delivery to the client workstation via the enterprise webserver. The secure webpage dataset, when executed at the client workstation, is configured to cause the client workstation to establish a secure communication connection with the security assurance webserver, bypassing the enterprise webserver. In doing so, the security assurance webserver may establish a secure webpage at the client workstation, via a secure communication connection.

The secure webpage can be used as an input platform for the client workstation to enter sensitive data, such as PAN data. The secure webpage acts to shield the client workstation from the entry of sensitive data and provide the sensitive data to the security assurance webserver. Since the secure webpage does not reveal any sensitive data to the client workstation, the client workstation remains a category three system under the PCI DSS standard, which in turn does not trigger an RCA audit.

Upon receipt of the sensitive data, the security assurance webserver may interact with an application server that is configured to process the sensitive data (e.g., payment information) received via the secure webpage. The application server may interact with third-party financial institutions to process the transaction, and in doing so, return a success/failure message to the security assurance webserver. A success message indicates that the transaction was successfully processed. The security assurance webserver may relay the success message to the client workstation via the secure webpage. In turn, the success message may be further relayed from the client workstation, via the secure webpage, to the enterprise webserver.

Alternatively, if the application server fails to process the transaction, the application server may return a failure message to the security assurance webserver. The security assurance webserver may relay the failure message to the client workstation, via the secure webpage. In turn, the failure message may be further relayed from the client workstation, via the secure webpage, to the enterprise webserver.

In some embodiments, the enterprise webserver may include a checkout timer as an additional security measure to ensure that order context data is not tampered with during the process of establishing a secure webpage. For example, the enterprise webserver may initiate the checkout timer at a first point in time when the merchant transaction is initiated at the client workstation. The checkout timer may be set to expire after a predetermined time interval that allows for the deployment of the secure webpage on the client workstation. If the secure webpage is not deployed within the predetermined time interval set by the checkout timer, the security assurance webserver may return an error message to the enterprise webserver. The error message may indicate that an error has occurred in generating the secure webpage and the consumer will not be able to initiate a credit card payment.

In this disclosure, the application server receives, stores, and transmits sensitive data. Accordingly, the application server is a category one system ("in scope" per PCI DSS), and thus subject to an RCA audit pursuant to the PCI DSS cybersecurity standard. Since the security assurance webserver has controlled access to a category one system, namely the application server, the security assurance webserver is a category two system ("in scope" per PCI DSS), and thus subject to an RCA audit pursuant to the PCI DSS cybersecurity standard. Additionally, since the enterprise webserver has limited access (e.g., communication connection) to security assurance webserver (e.g., category two system), and is thus not directly connected to a server that is exposed to sensitive data, the enterprise webserver is considered a category three system ("out of scope" per PCI DSS), and thus not subject to an RCA audit pursuant to the PCI DSS cybersecurity standard. The PCI DSS defines the client workstation as being "out of scope" as it is the client who is in control of that workstation and the client is entering their own sensitive card data. The client workstation is therefore not subject to an RCA audit pursuant to the PCI DSS cybersecurity standard.

The enterprise webserver is communicatively connected to the security assurance webserver, which is a category two system. Accordingly, the enterprise webserver is a category three system, and out of scope of PCI DSS, The log server is classed as a category three system because it does not access sensitive data and is not connected to a category one system. Instead, the log server is connected to the security assurance webserver, which is a category two system. More specifically, the log server receives metadata associated with a merchant transaction from the security assurance webserver. The security assurance webserver receives the metadata from the application server, As category three systems, the enterprise webserver and log server are not subject to an RCA audit pursuant to the PCI DSS cybersecurity standard.

The hashing server is classed as a class three system because it is isolated from category one systems. The hashing server has controlled access to the enterprise webserver and the log server, each of which is classed as category three systems. As a category three system, and therefore "out of scope", the hashing server is not subject to an RCA audit pursuant to the PCI DSS cybersecurity standard.

Further, the term "techniques," as used herein, may refer to system(s), method(s), computer-readable instruction(s), module(s), algorithms, hardware logic, and/or operation(s) as permitted by the context described above and through the document.

FIG. 1 illustrates an exemplary computing environment that facilitates isolating sensitive data associated with a merchant transaction from a client workstation. By isolating the client workstation 102, by definition in PCI DSS, is outside the scope of PCI DSS compliance, and thus not subject to an RCA audit.

In the illustrated embodiment, a security assurance network 104 is described that assures that the sensitive data from the client workstation 102 is provided to the application server 114. The client workstation 102 may correspond to any sort of electronic device, such as a cellular phone, a smartphone, a tablet computer, an electronic reader, a media player, a gaming device, a personal computer (PC, a laptop computer), etc.

In that regard, components of the security assurance network 104 are within the scope of PCI DSS compliance and thus subject to an RCA audit. The security assurance network 104 may comprise a hashing server 108, a security assurance webserver 110, and the application server 114. The enterprise webserver 106, hashing server 108, security assurance webserver 110, log server 112, and application server 114 may each operate on one or more distributed computing resource(s). The one or more distributed computing resource(s) may include one or more computing device(s) that operate in a cluster or other configuration to share resources, balance load, increase performance, provide fail-over support or redundancy, or for other purposes.

In one embodiment, the consumer may initiate a merchant transaction at a merchant website that is accessed via a client workstation 102. Initiating the merchant transaction may comprise adding products or services to a virtual merchant cart on the merchant webpage and selecting an option to "check out" to finalize the transaction. The enterprise webserver 106 of the security assurance network 104 may receive a transaction-start message from the client workstation 102 indicating that the consumer has initiated the merchant transaction. In turn, the enterprise webserver 106 may interact with the merchant webpage on the client workstation 102 to capture and generate order context data associated with the merchant transaction. The order context data may include information related to the merchant transaction such as a merchant identifier, product or service identifier, and transaction amount. It is noteworthy, however, that the order context data does not include sensitive data (e.g., PAN data). Accordingly, the order context data may be transmitted via an ordinary communication path 116.

The enterprise webserver 106 may generate enterprise webserver (EWS) metadata for delivery to a hashing server 108 via an ordinary communication path 116. The hashing server 108 may validate the integrity of the enterprise webserver based at least in part on analysis of the EWS metadata. For example, the EWS metadata may include a hash total of a set of files that reside on the enterprise server. The hashing server 108 may compare the hash total from the EWS metadata with registered hash totals accessible to the hashing server 108. If the hashing server 108 determines that the hash total of the EWS metadata matches the registered hash total, the hashing server can infer that the enterprise webserver has not been tampered with by an external actor, and in turn, return a "validated" message to the enterprise webserver 106. Otherwise, the hashing server 108 may return a "not validated" message to the enterprise webserver 106, indicating that the hash total of the EWS metadata did not match the registered hash total, and in turn, the enterprise webserver may have been tampered with by an external actor.

The hashing server 108 may periodically interrogate the enterprise webserver 106 to generate and maintain the registered hash total associated with the enterprise webserver 106. In one embodiment, the registered hash totals are stored within a repository that resides within the hashing server 108. In another embodiment, the registered hash total may reside on a remote server within the security assurance network 104 that is accessible by the hashing server 108.

Further, the hashing server 108 may transmit a log of application calls to a log server 112 within the security assurance network 104. The hashing server logs may be transmitted continuously or per a predetermined schedule.

The predetermined schedule may correspond to any time interval set by an administrator of the security assurance network 104.

In response to receiving a "validated" message from the hashing server 108, the enterprise webserver 106 may transmit the order context data to the security assurance webserver 110 via an ordinary communication path 116. In turn, the security assurance webserver 110 may generate a secure webpage dataset for delivery to the client workstation 102, via the enterprise webserver 106. The secure webpage dataset, when executed at the client workstation 102, is intended to establish a secure communication path 120 with the security assurance webserver 110, bypassing the enterprise webserver 106. Once the secure communication path 120 is established, the security assurance webserver 110 may generate the secure webpage 118 for presentation on the client workstation 102. The secure webpage 118 is configured to overlay the presentation of the merchant webpage on the client workstation 102 and provide an input platform for sensitive data, such as consumer PAN data. Further, the secure webpage 118 acts to provide the sensitive data as an encrypted data package that is devalued per PCI DSS for delivery through the security assurance webserver 110 and to the application server 114.

The enterprise webserver 106 may also transmit a checkout timer to the security assurance webserver 110 as an additional security measure for ensuring that the process of establishing a secure webpage 118 is not tampered with by an external actor. If the secure webpage 118 is not deployed within the predetermined time interval set by the checkout timer, the security assurance webserver may return an error message to the enterprise webserver.

The security assurance webserver 110 may transmit the order context data and the sensitive data to an application server 114 via a secure communication path 120. The application server 114 is configured to process the transaction based at least in part on the sensitive data. The application server 114 may interact with third-party financial institutions to process the transaction, and in doing so, return a success/failure message to the security assurance webserver 110.

Moreover, the application server 114 may transmit logs of all interactions with the security assurance webserver 110 to the log server 112 via an ordinary communication path 116. The application server logs may be scrubbed of personally identifiable information, such as consumer name, PAN data, and so forth. The application server logs, instead, may include transaction information, such as transaction total and the associated product service offering. The application server logs may also include transaction processing information for troubleshooting and support purposes.

The secure communication path 120 is configured to provide sufficient security for transmitting sensitive data. In contrast to an ordinary communication path 116, the secure communication path 120 is security-rated or otherwise considered to possess sufficient security to transmit sensitive data. In this way, transmitting sensitive data over the secure communication path 120 mitigates the risk of cybersecurity threats exposing the sensitive data.

The ordinary communication path 116 may be a typical communications connection established via any type of wired and/or wireless network, including but not limited to local area network(s) (LANs), virtual private networks (VPNs), wide area networks (WANs), satellite networks, cable networks, Wi-Fi networks, Wi-Max networks, mobile communication networks (e.g., 3G, 4G, and so forth), or any combination thereof.

It is noteworthy that even though most communication connections have some degree of encryption and security, the ordinary communication path, as described herein, is not security-rated nor is it otherwise considered to possess sufficient security to transmit sensitive data. Thus, the ordinary communication path 116 is configured to transmit non-sensitive data.

Figure 2:
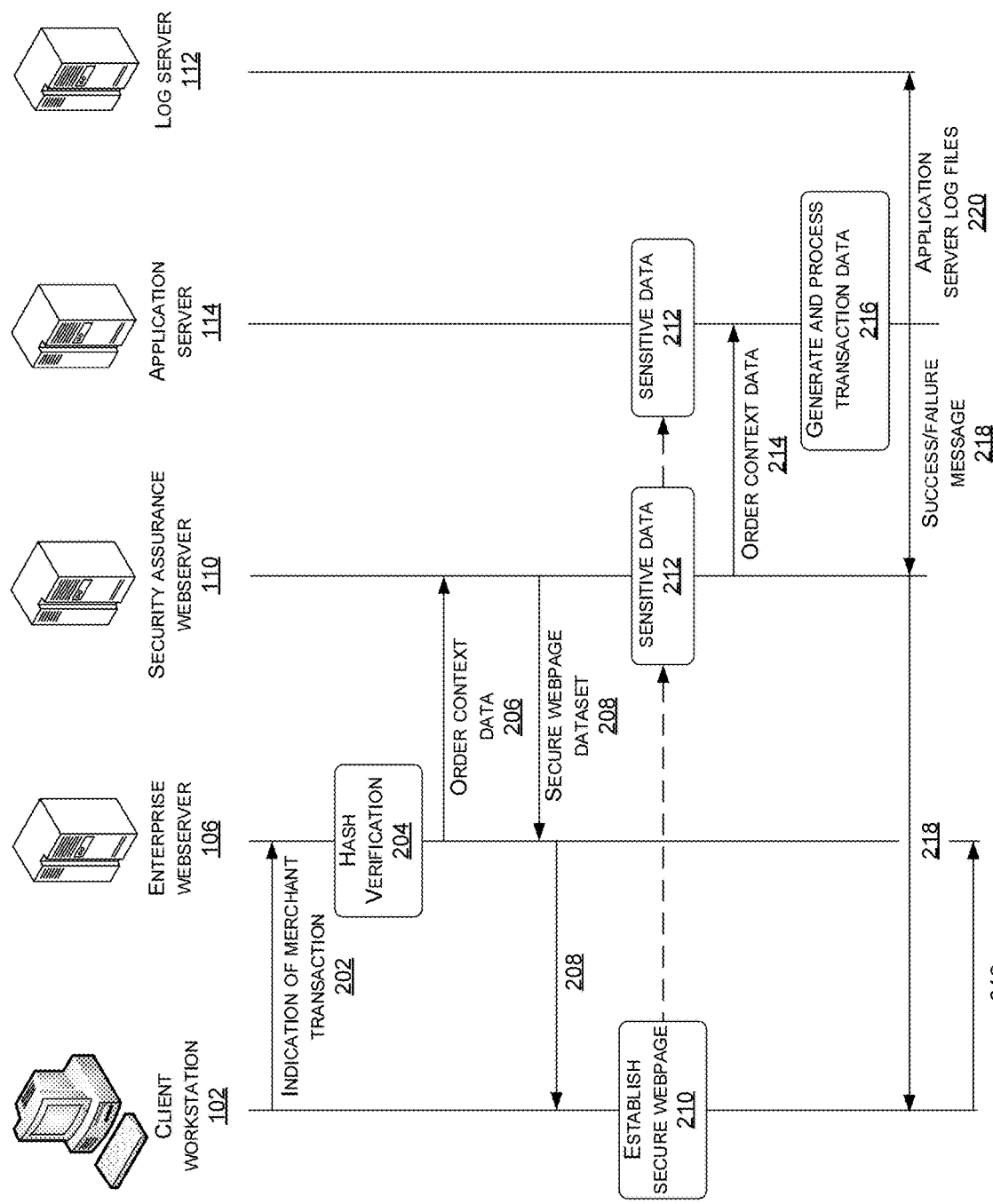
FIG. 2 illustrates a block diagram of an exemplary process for processing a merchant transaction via the security assurance network.

FIG. 2 illustrates a block diagram of an exemplary process for processing a merchant transaction via the security assurance network. At 202, the enterprise webserver 106 of a security assurance network 104 may receive an indication that a merchant transaction has been initiated via a merchant webpage, at a client workstation 102. Initiating the merchant transaction may comprise adding products or services to a virtual merchant cart on the merchant webpage and selecting an option to "check out" to finalize the transaction.

At 204, the enterprise webserver 106 may interact with the merchant webpage on the client workstation 102 to capture and generate order context data associated with the merchant transaction. Further, the enterprise webserver 106 may interact with a hashing server 108 to validate the integrity of the enterprise webserver 106. If the hashing server 108 validates the enterprise webserver 106, the process may continue to 206. Otherwise, if the hashing server 108 does not validate the enterprise webserver 106, the process may terminate. At 206, the enterprise webserver 106 may transmit the order context data along with a checkout timer to the security assurance webserver 110.

At 208, the security assurance webserver 110 may generate a secure webpage dataset for delivery to the client workstation 102, via the enterprise webserver 106. The secure webpage dataset may include computer-executable instructions that, when executed on the client workstation 102, establish a secure communication path 120 between the security assurance webserver 110 and the client workstation 102.

At 210, the security assurance webserver 110 may establish a secure webpage 118 at the client workstation 102 via the secure communication path 120. The secure webpage 118 may be configured to overlay the presentation of a merchant webpage on the client workstation 102. In turn, the secure webpage 118 provides an input platform for the entry of sensitive data (e.g., PAN data) at the client workstation 102. The secure webpage 118 acts to provide the sensitive data as an encrypted data package that is devalued per PCI DSS through the security assurance webserver 110 and to the application server 114.

At 212, the application server 114, via the security assurance webserver 110 may receive the sensitive data that was entered via the secure webpage 118. At 214, the security assurance webserver 110 may transmit the order context data to the application server 114. At 216, the application server 114 may generate and process transaction data based at least in part on the order context data received from the security assurance webserver 110 and sensitive data received via the secure webpage 118 (e.g., through the security assurance webserver 110). To process the transaction data, the application server 114 may interact with third-party financial institutions. At 218, the application server may return a success/failure message to the security assurance webserver, based on the processing outcome. The security assurance webserver 110 may forward the success/failure message received from the application server 114 to the client workstation 102, via the secure webpage 118. In turn, the success/failure message may be relayed to the enterprise webserver 106 via the client workstation 102.

Simultaneously, at 220, the application server 114 may generate application server logs for delivery to the log server 112, via the security assurance webserver 110. The application server logs may include transaction information—than sensitive data—and transaction processing information for troubleshooting and support purposes.

Figure 3:
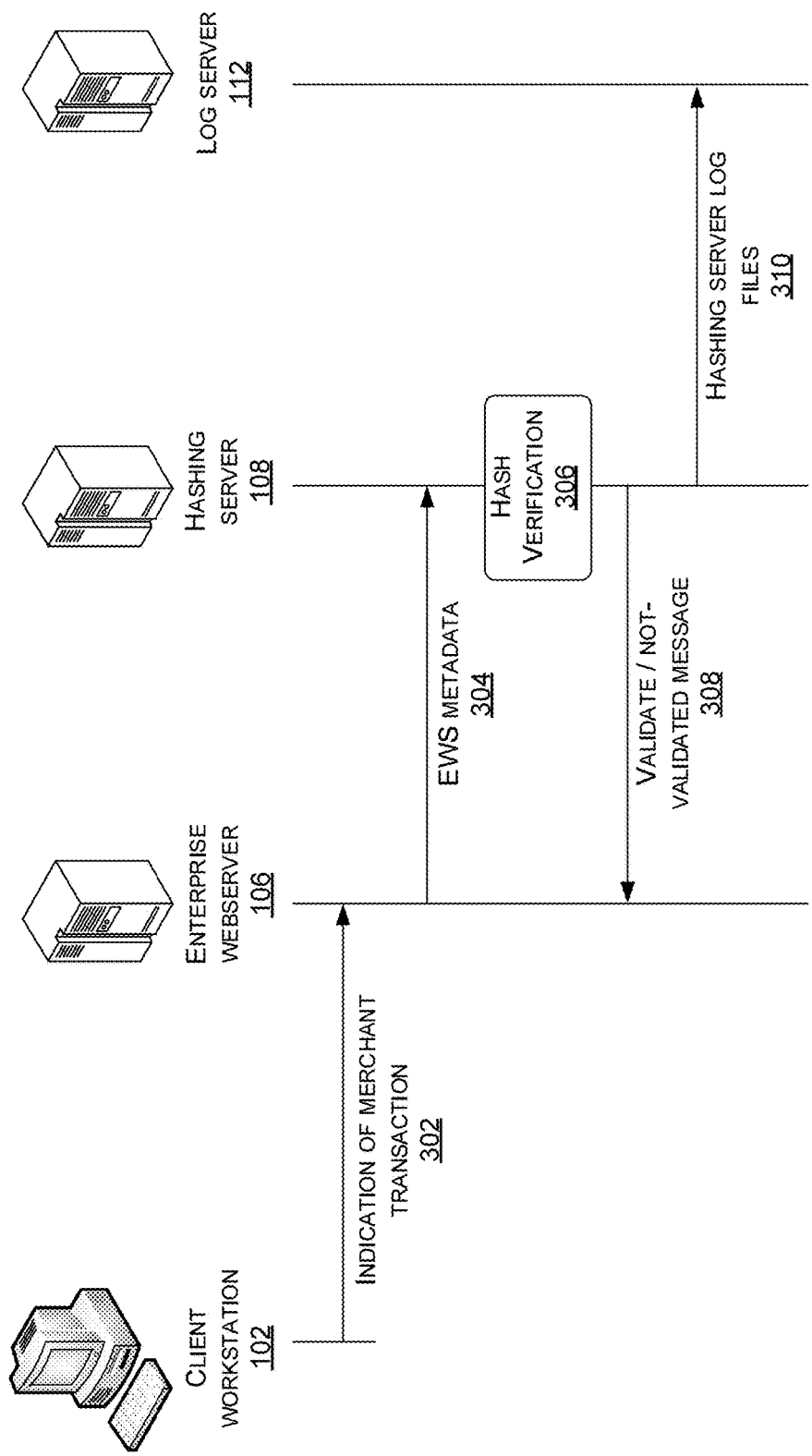
FIG. 3 illustrates a block diagram of an exemplary process of a hashing server validating the integrity of an enterprise webserver.

FIG. 3 illustrates a block diagram of an exemplary process of a hashing server validating the integrity of an enterprise webserver. At 302, a consumer may initiate a merchant transaction, via a merchant webpage, at a client workstation 102.

At 304, the enterprise webserver 106 may generate and transmit EWS metadata to the hashing server 108. The EWS metadata may include, in part, a hash total of a set of files that resides on the enterprise server. The enterprise webserver 106 may generate the hash total using a hash algorithm such as HMAC with SHA256, ECDSA, RSADDA-PSS, or any other suitable hash algorithm. Further, the set of files may comprise a portion, but not all, files stored on the enterprise webserver 106. Alternatively, the set of files may comprise substantially all files stored on the enterprise webserver.

The hashing server 108 may compare the hash total within the EWS metadata with a registered hash total for the enterprise webserver. The hashing server 108 may periodically interrogate the enterprise webserver 106 to generate and maintain the registered hash total associated with the enterprise webserver 106.

A match of hash totals may validate the integrity of the enterprise webserver 106. At 308, the hashing server 108 may transmit a "validated" message to the enterprise webserver 106. Otherwise, a mismatch of hash totals may indicate that the enterprise webserver 106 was likely tampered with by an external actor. Here, the hashing server 108 may transmit a "not validated" message to the enterprise webserver 106.

The hashing server 108 may generate a hashing server log for delivery to a log server 112 at 310. The hashing server log is intended to record application calls from the enterprise webserver 106 to the hashing server 108.

Figure 4:
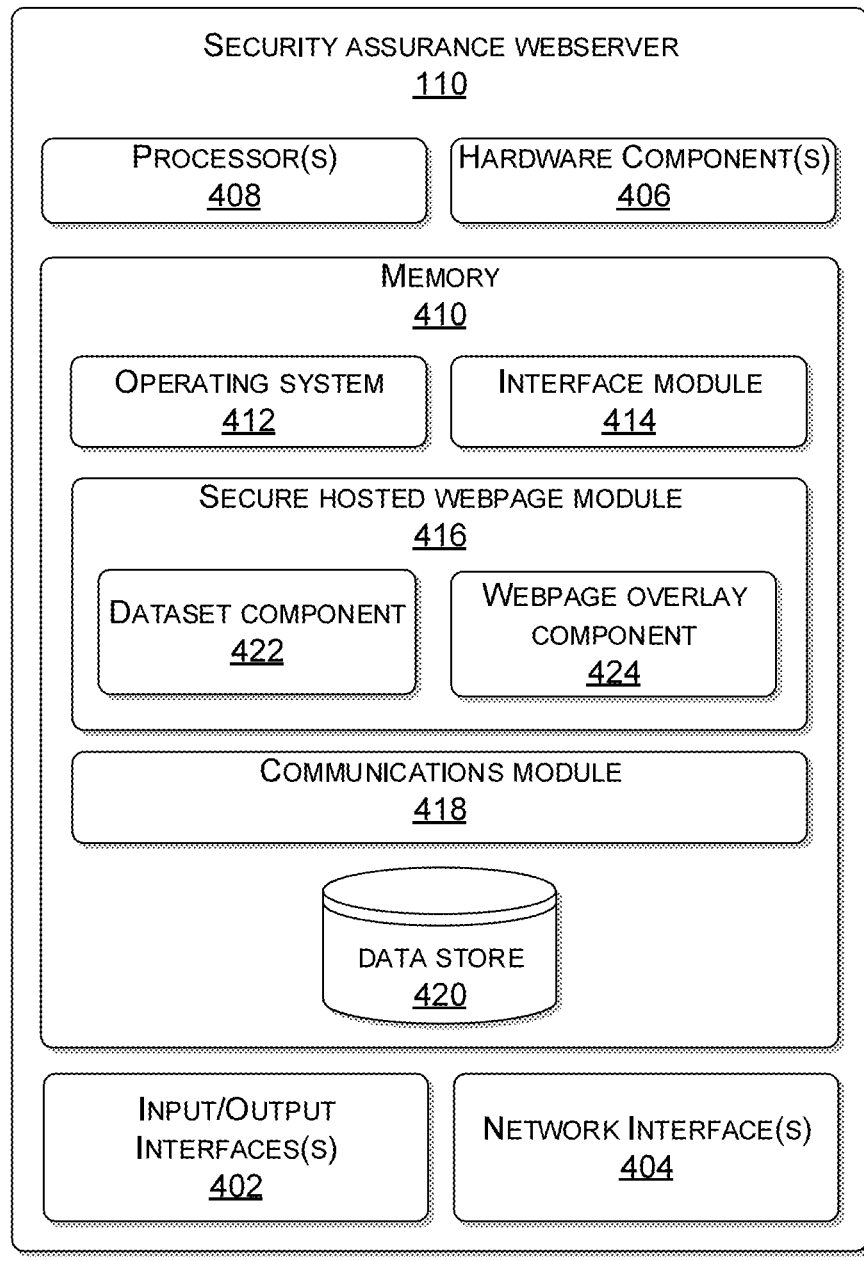
FIG. 4 illustrates various components of an example security assurance webserver.

FIG. 4 illustrates various components of an example security assurance webserver. The security assurance webserver 110 may include input/output interface(s) 402. The input/output interface(s) 402 may include any suitable type of output interface known in the art, such as a display (e.g., a liquid crystal display), speakers, a vibrating mechanism, or a tactile feedback mechanism. Input/output interface(s) 402 also includes ports for one or more peripheral devices, such as headphones, peripheral speakers, or a peripheral display. Further, the input/output interface(s) 402 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the security assurance webserver 110 may include network interface(s) 404. The network interface(s) 404 may include any suitable sort of transceiver known in the art. For example, the network interface(s) 404 may include a radio transceiver that performs the function of transmitting and receiving radio frequency communications via an antenna. Also, the network interface(s) 404 may include a wireless communication transceiver and a near-field antenna for communicating over unlicensed wireless Internet Protocol (IP) networks, such as local wireless data networks and personal area networks (e.g., Bluetooth or near field communication (NFC) networks). Further, the network interface(s) 404 may include wired communication components, such as an Ethernet port or a Universal Serial Bus (USB). Hardware component(s) 406 may include additional hardware interface, data communication hardware, and data storage hardware.

Further, the security assurance webserver 110 may include one or more processor(s) 408 that are operably connected to memory 410. In at least one example, the one or more processor(s) 408 may be a central processing unit(s) (CPU), graphics processing unit(s) (GPU), or both a CPU and GPU or any suitable sort of processing unit(s). Each of the one or more processor(s) 408 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 408 may also be responsible for executing all computer applications stored in the memory, which can be associated with common types of volatile (RAM) and/or non-volatile (ROM) memory.

In some examples, memory 410 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 410 may further include non-transitory computer-readable media, such as volatile and nonvolatile, removable, and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any suitable non-transitory medium which can be used to store the desired information.

In the illustrated example, the memory 410 may include an operating system 412, an interface module 414, a secure webpage module 416, a communications module 418, and a data store 420. The operating system 412 may be any suitable operating system capable of managing computer hardware and software resources. The operating system 412 may include an interface layer that enables applications to interface with the input/output interface(s) 402 and the network interface(s) 404.

The interface module 414 may be configured to interact with an enterprise webserver, an application server, and a client workstation via a secure webpage. Regarding the enterprise webserver, the interface module 414 may receive order context data and a checkout timer to facilitate establishing a secure webpage between the client workstation and the security assurance webserver 110. The interface module 414 may also transmit an error message to the enterprise webserver if the check-out timer expires before a secure webpage is deployed onto the client workstation.

Regarding the application server, the interface module 414 may transmit encrypted transaction data associated with a merchant transaction for processing of payment data. The interface module 414 may also receive a success/failure message from the application server that is associated with processing the payment data.

Regarding the client workstation, the interface module 414 may receive sensitive data (e.g., PAN data) via s secure webpage at the client workstation. The interface module 414 may further relay a success/failure message associated with the processing of payment data, to the client workstation via the secure webpage.

The secure webpage module 416 may further include a dataset component 422 and a webpage overlay component 424. The dataset component 422 may be configured to generate a secure webpage dataset for delivery to the client workstation, via the enterprise webserver. The secure webpage dataset may include computer-executable instructions that, when executed on the client workstation, establish a secure communication path from the client workstation, through the security assurance webserver 110 to the application server 114.

Once the secure communication path is established, the webpage overlay component 424 may deploy the secure webpage onto the client workstation. The secure webpage is configured to overlay a presentation of a merchant webpage on the client workstation and provide an input platform for sensitive data, such as PAN data. A typical example of such an input platform is an "i-frame" or a "hosted webpage."

Moreover, the dataset component 422 and webpage overlay component 424 may collectively monitor the checkout timer received from the enterprise webserver. If the checkout timer expires prior to completion of each task, the dataset component 422 or webpage overlay component 424 that is responsible for the incomplete task may interact with the communications module 418 to deliver an error or warning message to the enterprise webserver.

The communications module 418 may be configured to generate communication messages for delivery to the application server, the enterprise webserver, and the log server, or any other suitable communication points, based on operations at the security assurance webserver 110. Communication messages may include an error or warning message that the checkout timer has expired prior to deploying a secure webpage on the client workstation. In another example, the communication messages may include metadata for logging.

The data store 420 may include order context data, secure webpage datasets, transaction data, communication messages, and any other suitable data that is pertinent to an operation of the security assurance webserver 110.

Figure 5:
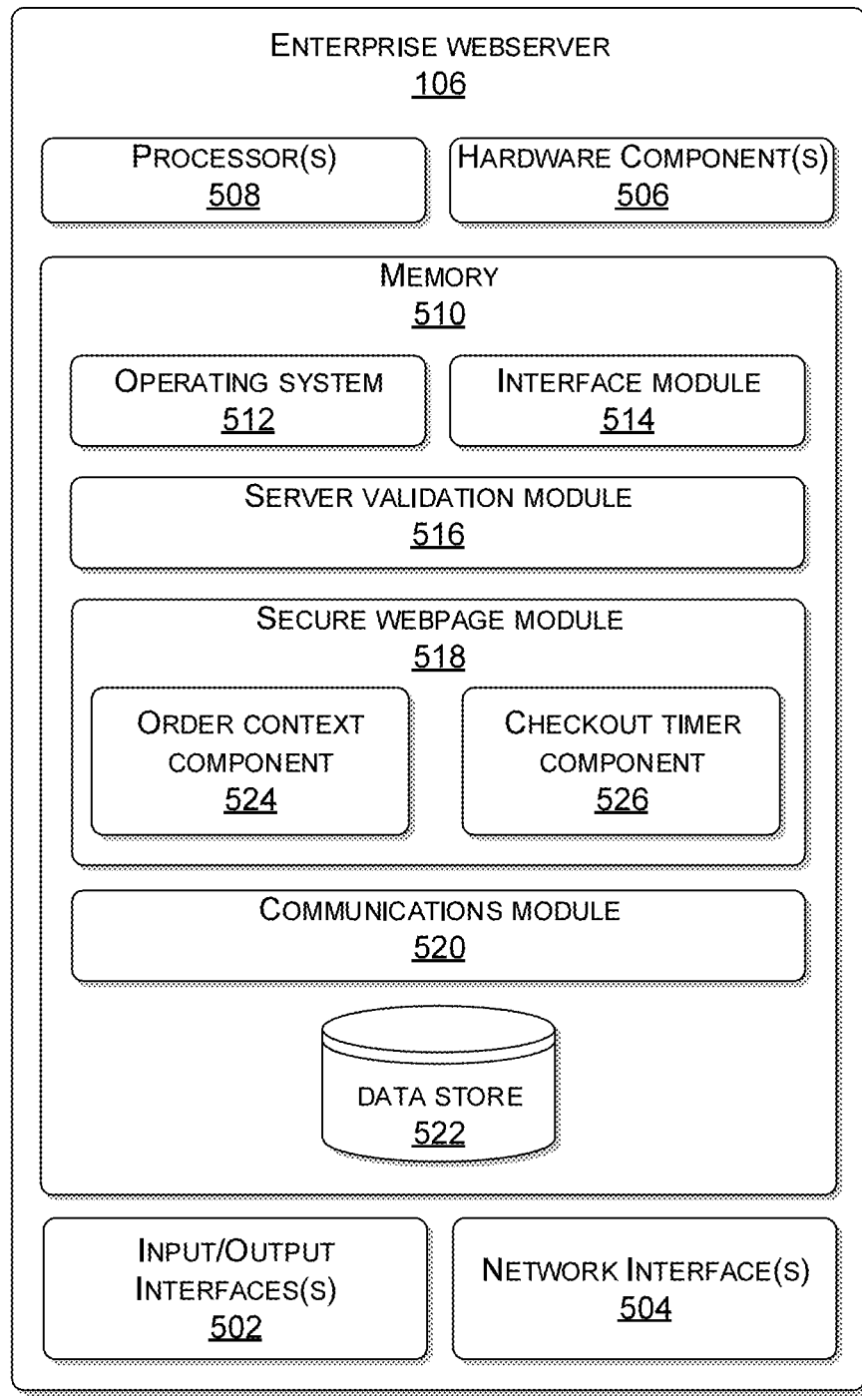
FIG. 5 illustrates various components of an example enterprise webserver.

FIG. 5 illustrates various components of an example enterprise webserver. The enterprise webserver 106 may include input/output interface(s) 502 and network interface(s) 504. The input/output interface(s) 502 may be functionally similar to input/output interface(s) 402, and the network interface(s) 504 may be similar to network interface(s) 404. Hardware component(s) 506 may include additional hardware interface, data communication hardware, and data storage hardware.

The enterprise webserver 106 may include one or more processor(s) 508 that are operably connected to memory 510. The one or more processor(s) 508 may be functionally similar to the one or more processor(s) 408, and the memory 510 may be similar to the memory 410.

The memory 510 may include an operating system 512, an interface module 514, a server validation module 516, a secure webpage module 518, a communications module 520, and a data store 522. The operating system 512 may be any suitable operating system capable of managing computer hardware and software resources. The operating system 512 may include an interface layer that enables applications to interface with the input/output interface(s) 502 and the network interface(s) 504.

The interface module 514 may be configured to interact with a client workstation, hashing server, and security assurance webserver. Referring to the client workstation, the interface module 514 may interact with the client workstation to capture and generate order context data associated with a merchant transaction. The interface module 514 may further transmit to the client workstation, a secure webpage dataset that is intended to establish a secure communication path between the client workstation and the security assurance webserver. The interface module 514 may also receive, from the client workstation, an indication of whether a merchant transaction was successful. The interface module 514 may interact with the communications module 520 to deliver messages to the client workstation.

Regarding the hashing server, the interface module 514 may transmit EWS metadata to the hashing server, for the hashing server to validate the integrity of the enterprise webserver. In return, the interface module 514 may receive a "validated" or "not validated" message from the hashing server. The interface module 514 may transmit registered hash totals associated with a set of files that reside on the enterprise webserver. The registered hash totals may be sent periodically at a time interval set by an administrator of the security assurance network.

Regarding the security assurance webserver, the interface module 514 may transmit order context data and a checkout timer to the security assurance webserver to facilitate establishing a secure webpage at the client workstation. In return, the interface module 514 may receive a secure webpage dataset from the security assurance webserver for delivery to the client workstation. Alternatively, the interface module 514 may receive an error message from the security assurance webserver if a checkout timer expires before the security assurance webserver having deployed a secure webpage at the client workstation.

The server validation module 516 may generate EWS metadata for delivery to the hashing server. The EWS metadata may include the Internet Protocol (IP) address of the enterprise webserver, a merchant identifier, a date and time stamp associated with generating the EWS metadata, and filenames and hash total for a set of files on the enterprise webserver. The enterprise webserver may generate the hash total using a hash algorithm such as HMAC with SHA256, ECDSA, RSADDA-PSS, or any other suitable hash algorithm. Further, the set of files may comprise a portion, but not all, files stored on the enterprise webserver. Alternatively, the set of files may comprise substantially all files stored on the enterprise webserver.

Moreover, the server validation module 516 may periodically transmit registered hash totals of the set of files to the hashing server. The registered hash totals are used as a baseline reference by the hashing server to analyze the EWS metadata. The server validation module 516 may generate and deliver registered hash totals to the hashing server based on a predetermined schedule set by an administrator of the security assurance network.

The secure webpage module 518 may further comprise an order context component 524 and a checkout timer component 526. The order context component 524 may be configured to capture and generate order context data associated with a merchant transaction initiated at a client workstation. The order context data may comprise a merchant identifier, merchant service provider, a product or service identifier, a consumer identifier for the consumer that initiated the merchant transaction, a transaction amount, a transaction currency, and acceptable forms of payment to fulfill the transaction, or any suitable combination thereof.

The checkout timer component 526 may generate a checkout timer as an additional security measure to ensure that order context data is not tampered with during the process of establishing a secure webpage. The checkout timer may be set to commence at a first point-in-time when the merchant transaction is initiated at the client workstation. The checkout timer may be set to expire after a predetermined time interval that allows for the deployment of the secure webpage on the client workstation.

The communications module 520 may be configured to transmit communication messages to the client workstation based on operations within the security assurance network. Communication messages may include i) the hashing server returning a "not validated" message; ii) the security assurance webserver returning an error due to the checkout timer expiring prior to establishing a secure webpage, or iii) an application server returning a payment processing error.

The data store 522 may include a repository of EWS metadata, registered hash totals, order context data, secure webpage data sets, communication messages, and any other suitable data that is pertinent to an operation of the enterprise webserver 106.

Figure 6:
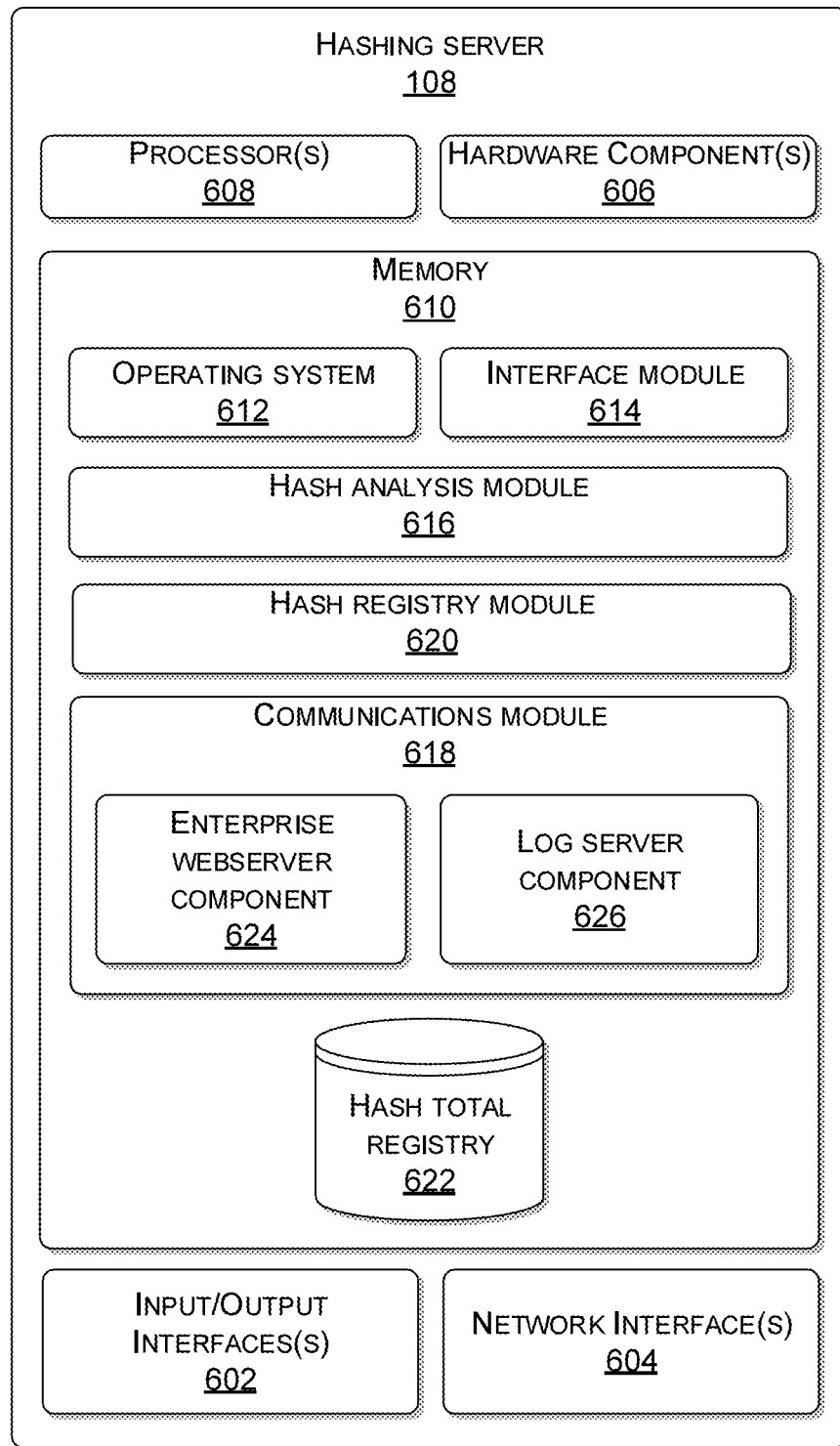
FIG. 6 illustrates various components of an example hashing server.

FIG. 6 illustrates various components of an example hashing server. The hashing server 108 may include input/output interface(s) 602 and network interface(s) 604. The input/output interface(s) 602 may be functionally similar to input/output interface(s) 402 or 502, and the network interface(s) 604 may be similar to network interface(s) 404 or 504. Hardware component(s) 606 may include additional hardware interface, data communication hardware, and data storage hardware.

The hashing server 108 may include one or more processor(s) 608 that are operably connected to memory 610. The one or more processor(s) 608 may be functionally similar to the one or more processor(s) 408 or 508, and the memory 610 may be similar to the memory 410 or 510.

The memory 610 may include an operating system 612, an interface module 614, a hash analysis module 616, a communications module 618, a hash registry module 620, and a data store 622. The operating system 612 may be any suitable operating system capable of managing computer hardware and software resources. The operating system 612 may include an interface layer that enables applications to interface with the input/output interface(s) 602 and the network interface(s) 604.

The interface module 614 may be configured to receive EWS metadata from an enterprise webserver. The EWS metadata may be used to validate the integrity of the enterprise webserver. Also, the interface module 614 may transmit a "validated" or "not validated" message to the enterprise webserver, based at least in part on the success of the validation process. Further, the interface module 614 may interact with the enterprise webserver to retrieve registered hash totals associated with the enterprise webserver.

The interface module 614 may also transmit hashing server logs to a log server within the security assurance network. In some embodiments, the interface module 614 may interact with a remote server within the security assurance network to access registered hashing totals used in the validation process of the enterprise webserver.

The hash analysis module 616 may parse EWS metadata to retrieve a hash total associated with an enterprise webserver. The hash analysis module 616 may further retrieve a registered hash total associated with the enterprise webserver, based on an enterprise webserver identifier within the EWS metadata. The enterprise webserver identifier may comprise an IP address of the enterprise webserver.

In this way, the hash analysis module 616 may compare the hash total from the EWS metadata to the registered hash total of the enterprise webserver. If the hash total and registered hash total match, the hash analysis module 616 can determine that the enterprise webserver is validated and further indicate the same to the communications module 618. Alternatively, if the hash total and registered hash total do not match, the hash analysis module 616 can determine that the enterprise webserver is not validated and further indicate the same to the communications module 618.

Hash registry module 620 may periodically interrogate the enterprise webserver to generate and maintain a registered hash total that is associated with the enterprise webserver. The registered hash total may comprise a hash of a set of files that reside on the enterprise webserver.

The communications module 618 may include an enterprise webserver component 624 and a log server component 626. The enterprise webserver component 624 may generate a "validated" or "not validated" message for delivery to an enterprise webserver, based at least in part on an indication from the hash analysis module 616. If the hash analysis module 616 indicates that an enterprise webserver has been validated, the enterprise webserver component 624 may transmit a "validated" message to the enterprise webserver. Similarly, if the hash analysis module 616 indicates that an enterprise webserver is not validated, the enterprise webserver component 624 may transmit a "not validated" message" to the enterprise webserver.

The log server component 626 may be configured to generate hashing server log files for delivery to a log server. Each hashing server log that is sent by the hashing server 108 to the log server 112 may include receipt of a hash total (e.g., hash total associated with EWS metadata, a registered hash total, or a combination thereof), merchant identifier associated with the order context data, IP address associated with the merchant of the order context data, an indication of whether the hash total of the EWS metadata matched the registered hash total of the enterprise webserver, an indication of any unexpected error that may have occurred during the processing of the hash totals, or any suitable combination thereof.

The data store 622 may store registered hash totals associated with the enterprise webserver and any other suitable data that is pertinent to an operation of the hashing server 108.

Figure 7:
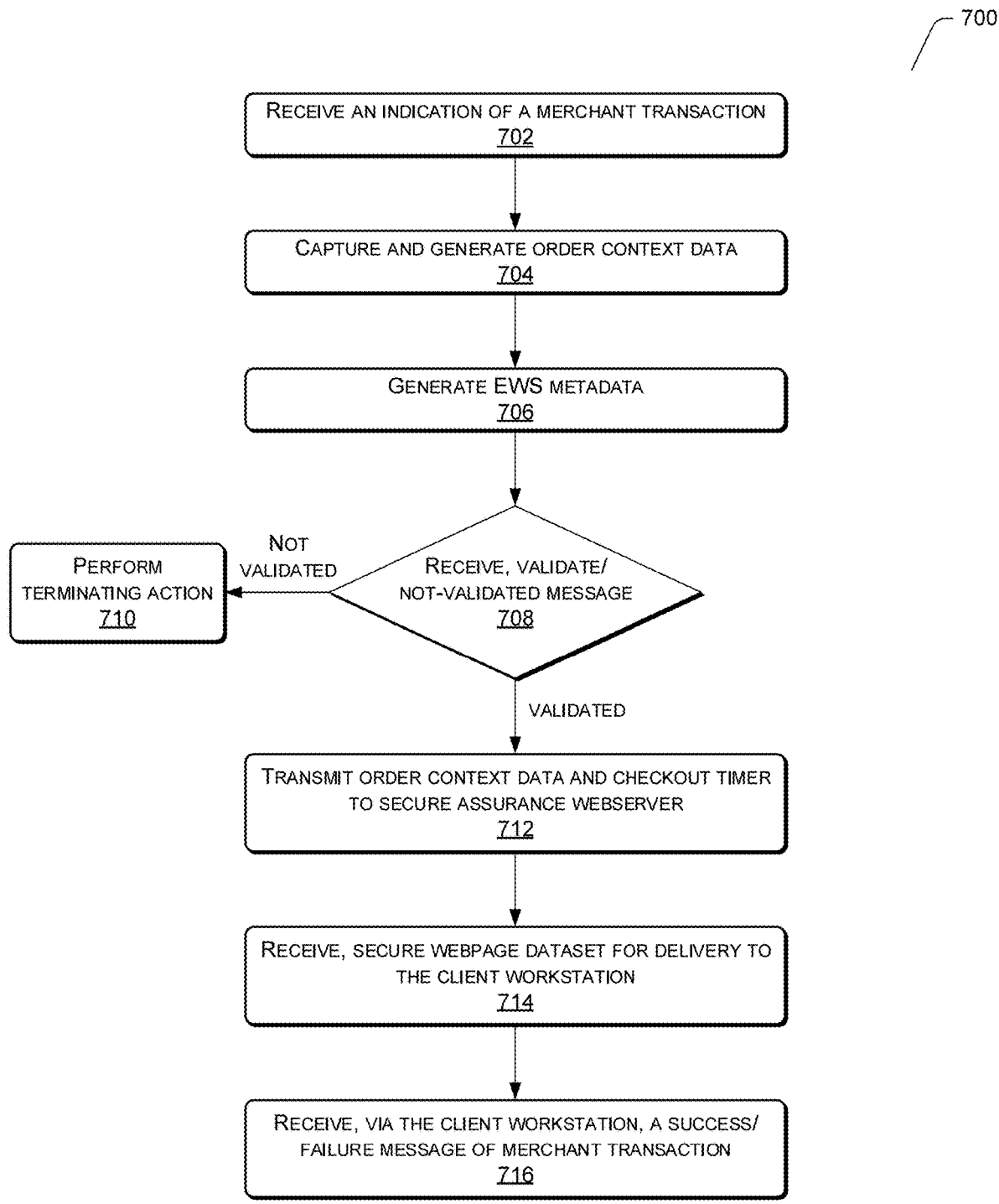
FIG. 7 illustrates an exemplary process of an enterprise webserver facilitating the processing of a merchant transaction within the security assurance network.
Figure 8:
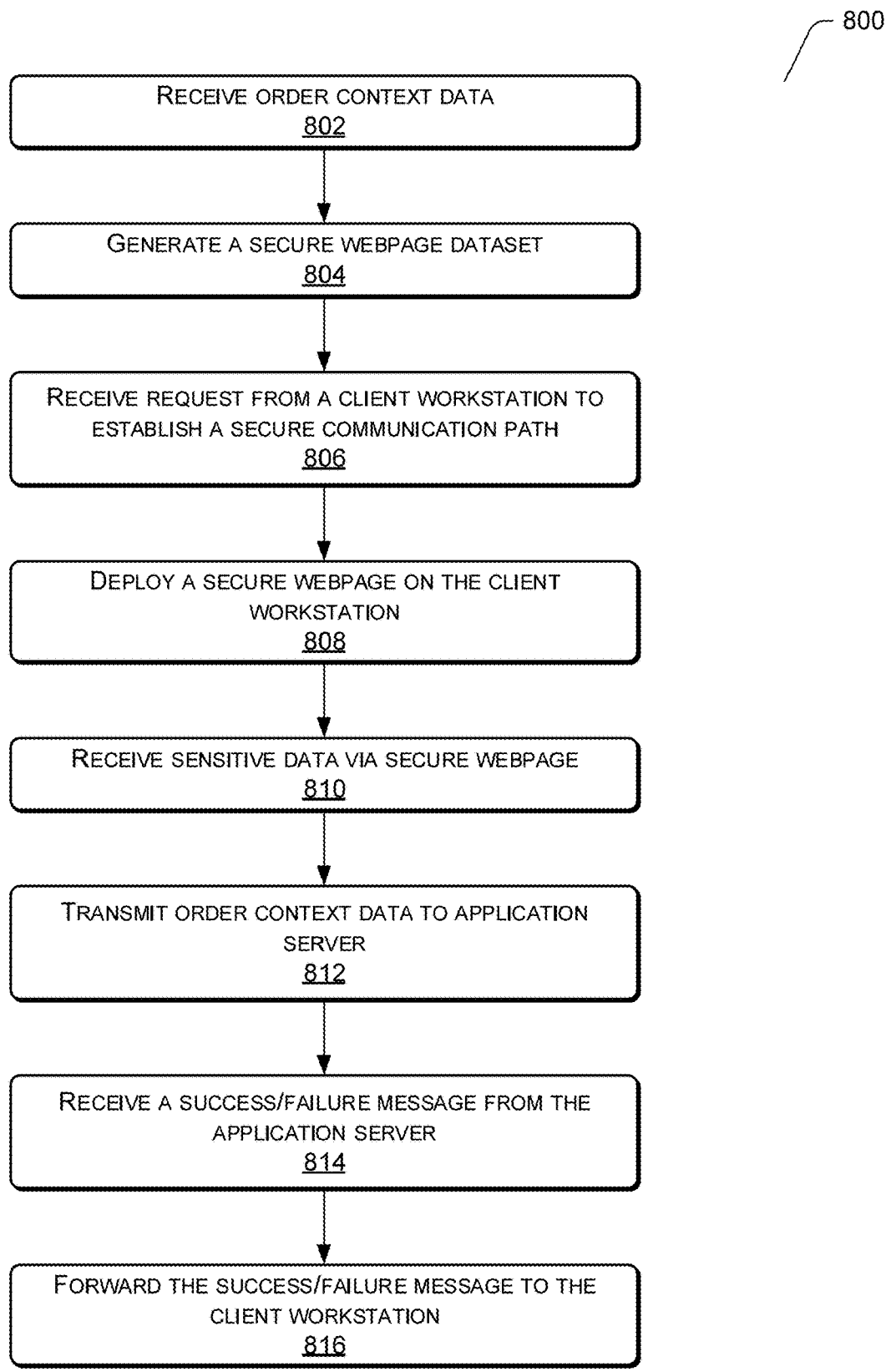
FIG. 8 illustrates an exemplary process of a security assurance webserver facilitating the processing of a merchant transaction within the security assurance network.

FIGS. 7 and 8 present processes 700 and 800 that relate to operations of the security assurance webserver 110. Each of processes 700 and 800 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, processes 700 and 800 are described with reference to the computing environment 100 of FIG. 1.

FIG. 7 illustrates an exemplary process of an enterprise webserver facilitating the processing of a merchant transaction within the security assurance network. Process 700 is described from the perspective of an enterprise webserver of the security assurance network.

At 702, the enterprise webserver may receive an indication that a merchant transaction has been initiated at a merchant webpage of the client workstation. Initiating the merchant transaction may comprise adding a product or service to a virtual merchant cart on the merchant webpage and selecting an option to "check out."

At 704, the enterprise webserver may interact with the merchant webpage on the client workstation to capture and generate order context data associated with the merchant transaction. The order context data may include a merchant identifier, merchant service provider, a product or service identifier, a consumer identifier for the consumer that initiated the merchant transaction, a transaction amount, a transaction currency, and acceptable forms of payment to fulfill the transaction, or any suitable combination thereof.

At 706, the enterprise webserver may generate EWS metadata for delivery to a hashing server. The EWS metadata may include the Internet Protocol (IP) address of the enterprise webserver, a merchant identifier, a date, and time stamp. The hashing server may use the EWS metadata to validate the integrity of the enterprise webserver.

At 708, the enterprise webserver may receive a "validated" or a "not validated" message from the hashing server in response to the validation process. If the enterprise webserver receives a "not validated" message, process 700 may proceed to 710. At 710, the enterprise webserver may perform one of several discrete actions including, but not limited to, requesting that the consumer try and perform the merchant transaction again, direct the consumer to contact customer service, or direct the consumer to submit an order with a purchase order number.

If, however, at 708, the enterprise webserver receives a "validated" message, process 700 may proceed to 712. At 712, the enterprise webserver may transmit the order context data and a checkout timer to the security assurance webserver. The security assurance webserver may use the order context data to generate a secure webpage dataset for delivery to the client workstation. The checkout timer is an additional security measure that ensures a timely deployment of the secure webpage. A timely deployment reduces the opportunity for an external actor to tamper with the secure webpage.

At 714, the enterprise webserver may receive a secure webpage dataset for delivery to the client workstation. The secure webpage dataset includes computer-executable instructions, that when executed on the client workstation, establish a secure communication path between the client workstation and the security assurance webserver. Once established, the secure communication path can be used by the security assurance web server to deploy a secure webpage at the client workstation.

At 716, the enterprise webserver may receive, via the client workstation, a success/failure message associated with the merchant transaction. A success message indicates that the merchant transaction was successfully processed. A failure message indicates that an error occurred during the processing of the merchant transaction.

FIG. 8 illustrates an exemplary process of a security assurance webserver facilitating the processing of a merchant transaction within the security assurance network. Process 800 is described from the perspective of a security assurance webserver of the security assurance network.

At 802, the security assurance webserver may receive the order context data and a checkout timer from an enterprise webserver. The order context data may include a merchant identifier, merchant service provider, a product or service identifier, a consumer identifier for the consumer that initiated the merchant transaction, a transaction amount, a transaction currency, and acceptable forms of payment to fulfill the transaction, or any suitable combination thereof.

Further, the check-out timer may be used as an additional security measure to ensure timely deployment of a secure webpage on a client workstation.

At 804, the security assurance webserver may generate a secure webpage dataset for delivery to the enterprise webserver. The secure webpage dataset may include computer-executable instructions that, when executed on the client workstation, establish a secure communication path between the client workstation and the security assurance webserver.

At 806, the security assurance webserver may receive a request from the client workstation to establish a secure communication path, based at least in part on the execution of the secure webpage dataset on the client workstation.

At 808, the security assurance webserver may deploy a secure webpage on the client workstation via the secure communication path. The secure webpage may overlay a presentation of a merchant webpage on the client workstation, and further provide an input platform for the entry of sensitive data, such as PAN data. At 810, the sensitive data is relayed to the application server, via the secure assurance webserver. The sensitive data may comprise PAN data.

At 812, the security assurance webserver may transmit the order context data to the application server. In turn, the application server may generate transaction data. The transaction data may comprise the order context data and the sensitive data received via the secure webpage. Upon receipt, the application server may process, or facilitate processing (e.g., via third-party financial institutions) the transaction data.

At 814, the security assurance may receive a success/failure message from the application server. A success message indicates that the merchant transaction (e.g., based on the processing of the transaction data) was successfully processed. A failure message indicates that an error occurred during the processing of the merchant transaction.

At 816, the security assurance webserver may forward the success/failure message to the client workstation, via the secure webpage. In turn, the success/failure may be relayed to the enterprise webserver via the client workstation.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A security assurance webserver, comprising:
one or more processors;
memory coupled to the one or more processors, the memory including one or more modules that are executable by the one or more processors to:
receive, from an enterprise webserver, order context data associated with a merchant transaction at a client workstation;

generate a secure webpage dataset for delivery to the client workstation via the enterprise webserver, the secure webpage dataset to initiate a secure communication connection between the client workstation and the security assurance webserver;

configure a secure webpage to provide an input platform for entry of payment data associated with the merchant transaction, wherein the payment data includes sensitive data that includes a personal account number and sensitive account data, the secure webpage to receive the sensitive data; and configuring the secure webpage is based at least in part on delivery of the secure webpage dataset to the client workstation;

deploy the secure webpage as an overlay on a presentation of a webpage on the client workstation;

receive the sensitive data via the secure webpage; and receive, from the enterprise webserver, a checkout timer that is set to commence at a first point-in-time when the merchant transaction is initiated at the client workstation, the checkout timer to expire at a second point-in-time that follows the first point-in-time by a predetermined time interval, wherein configuring the secure webpage is based at least in part on delivery of the secure webpage dataset to the enterprise webserver prior to an expiration of the checkout timer.

2. The security assurance webserver of claim 1, wherein the order context data includes at least a merchant identifier and purchase data associated with the merchant transaction.

3. The security assurance webserver of claim 1, wherein the one or more modules are further executable by the one or more processors to:

transmit an error message to the enterprise webserver in response to the expiration of the checkout timer prior to delivery of the secure webpage dataset to the enterprise webserver.

4. The security assurance webserver of claim 1, wherein the one or more modules are further executable by the one or more processors to:

receive, from the client workstation, a request to initiate a secure communication connection with the client workstation.

5. The security assurance webserver of claim 1, wherein the one or more modules are further executable by the one or more processors to:

in response to deploying the secure webpage, transmit, via a second secure communication connection, the sensitive data to an application server, the application server to process the sensitive data;

receive, from the application server, a processing message indicating whether the sensitive data was processed, and transmit, via the secure webpage, a message that is based at least in part on the processing message.

6. An enterprise webserver, comprising:
one or more processors;
memory coupled to the one or more processors, the memory including one or more modules that are executable by the one or more processors to:
receive, from a client workstation, a first message associated with a merchant transaction at a merchant website;
generate a checkout timer that commences at a first point-in-time when the merchant transaction is initiated at the client workstation, the checkout timer to expire at a second point-in-time that follows the first point-in-time by a predetermined time interval;

generate a hash of a set of files stored on the enterprise webserver;

generate server identity data for use in validating integrity of the enterprise webserver, wherein the server identity data includes at least the hash of the set of files stored on the enterprise webserver;

transmit, to a hashing server, the server identity data;

receive, from the hashing server, a response associated with validating the integrity of the enterprise webserver;

in accordance with the response validating the integrity of the enterprise webserver, transmit a secure webpage dataset to the client workstation, the secure webpage dataset including a set of computer-executable instructions that initiate a secure communication connection between the client workstation and a security assurance webserver over which to deploy a secure webpage on the client workstation, the secure webpage to overlay a presentation of the merchant website on the client workstation; and receive, from the client workstation, a second message indicating a processing status of the merchant transaction.

7. The enterprise webserver of claim 6, wherein the one or more modules are further executable by the one or more processors to:

in accordance with the response not validating the integrity of the enterprise webserver, transmit an alert message indicating that a processing error of the merchant transaction has occurred.

8. The enterprise webserver of claim 6, wherein the one or more modules are further executable by the one or more processors to:

in accordance with the response validating the integrity of the enterprise webserver, generate order context data for delivery to the security assurance webserver, based at least in part on the first message, the order context data to include at least a consumer identifier associated with the merchant transaction; and receive, from the security assurance webserver, the secure webpage dataset, based at least in part on the order context data.

9. The enterprise webserver of claim 8, wherein the one or more modules are further executable by the one or more processors to:

transmit the checkout timer to the security assurance webserver;

receive, from the security assurance webserver, an alert message responsive to an expiration of the checkout timer prior to delivery of the secure webpage dataset to the enterprise webserver; and transmit to the client workstation, a second alert message indicating that a processing error of the merchant transaction has occurred.

10. The enterprise webserver of claim 7, wherein the alert message is transmitted to the client workstation.

11. The enterprise webserver of claim 8, wherein the one or more modules are further executable by the one or more processors to:

in accordance with the response validating the integrity of the enterprise webserver, transmit, to the security assurance webserver, the order context data and the checkout timer.

12. One or more non-transitory computer-readable media having one or more modules that are executable by one or more processors of an enterprise webserver to:
- receive, from a client workstation, a first message associated with a merchant transaction at a merchant website;
- generate a checkout timer that commences at a first point-in-time when the merchant transaction is initiated at the client workstation, the checkout timer to expire at a second point-in-time that follows the first point-in-time by a predetermined time interval;
- generate a hash of a set of files stored on the enterprise webserver;
- generate server identity data for use in validating integrity of the enterprise webserver, wherein the server identity data includes at least the hash of the set of files stored on the enterprise webserver;
- transmit, to a hashing server, the server identity data;
- receive, from the hashing server, a response associated with validating the integrity of the enterprise webserver;
- in accordance with the response validating the integrity of the enterprise webserver, transmit a secure webpage dataset to the client workstation, the secure webpage dataset including a set of computer-executable instructions that initiate a secure communication connection between the client workstation and a security assurance webserver over which to deploy a secure webpage on the client workstation, the secure webpage to overlay a presentation of the merchant website on the client workstation; and
- receive, from the client workstation, a second message indicating a processing status of the merchant transaction.

13. The one or more non-transitory computer-readable media of claim 12, wherein the one or more modules are further executable by the one or more processors to:
- in accordance with the response not validating the integrity of the enterprise webserver, transmit an alert message indicating that a processing error of the merchant transaction has occurred.

14. The one or more non-transitory computer-readable media of claim 12, wherein the one or more modules are further executable by the one or more processors to:
- in accordance with the response validating the integrity of the enterprise webserver, generate order context data for delivery to the security assurance webserver, based at least in part on the first message, the order context data to include at least a consumer identifier associated with the merchant transaction; and
- receive, from the security assurance webserver, the secure webpage dataset, based at least in part on the order context data.

15. The one or more non-transitory computer-readable media of claim 12, wherein the one or more modules are further executable by the one or more processors to:
- transmit the checkout timer to the security assurance webserver;
- receive, from the security assurance webserver, an alert message responsive to an expiration of the checkout timer prior to delivery of the secure webpage dataset to the enterprise webserver; and
- transmit to the client workstation, a second alert message indicating that a processing error of the merchant transaction has occurred.

16. The one or more non-transitory computer-readable media of claim 13, wherein the alert message is transmitted to the client workstation.

17. The one or more non-transitory computer-readable media of claim 14, wherein the one or more modules are further executable by the one or more processors to:
- in accordance with the response validating the integrity of the enterprise webserver, transmit, to the security assurance webserver, the order context data and the checkout timer.

\* \* \* \* \*